May 16, 1939.  B. V. FESTENBERG-PAKISCH  2,158,622

DRIVING CHAIN

Filed Jan. 11, 1938

INVENTOR:
BRUNO V. FESTENBERG-PAKISCH
BY Haseltine, Lake & Co.
ATTORNEYS

Patented May 16, 1939

2,158,622

UNITED STATES PATENT OFFICE 2,158,622

DRIVING CHAIN

Bruno v. Festenberg-Pakisch, Hamburg, Germany

Application January 11, 1938, Serial No. 184,387
In Great Britain April 6, 1937

6 Claims. (Cl. 74—251)

This invention relates to driving chains of the kind, wherein the chain links are held together by pins passed through eyes in the links, the pins projecting on both sides of the links and being adapted to engage driving and driven sprockets. It has been found that in driving chains of this type unequal stresses are often imposed by the sprockets upon the ends of the pins, whereby the chain is subjected to uneven wear and its useful life is cut short.

The object of the invention is to provide a driving chain of the kind referred to, which will not be affected by the unequal stresses imposed by the sprockets upon the pin ends.

With this object in view and according to the invention, in a chain of the kind set forth the pins are provided with sleeves engaged with play by the links.

Various embodiments of the invention are illustrated in the accompanying drawing, wherein.

Figure 1:
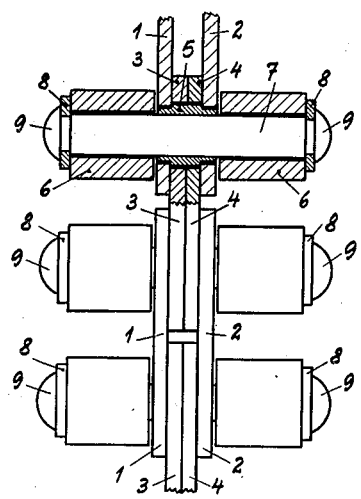
Fig. 1 shows an embodiment partly in section and partly in elevation.

Referring to Fig. 1, the pin 7 has mounted thereon centrally of its length, preferably in fixed relationship thereto, a sleeve 5 which is engaged with play by the links 1, 2 extending towards one side and the links 3, 4 extending towards the other side. As shown, the sleeve 5 is shouldered off at its ends, the links 1, 2 engaging the shouldered or reduced portions and the links 3, 4 engaging the centre portion of the sleeve. The ends of the pin 7 project from or overhang the links on both sides and have loosely mounted thereon rollers 6 adapted to engage duplex driving or driven sprockets. The rollers 6 are retained in position on the pins 7 by means of washers 8 and rivet heads 9. The pins 7 may also be made in bolt and nut form.

Figure 2:
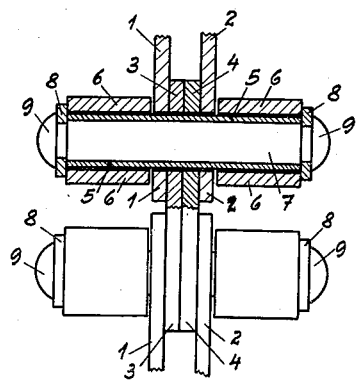
Figs. 2 and 3 show further embodiments in similar representation.

In the embodiment shown in Fig. 2 the sleeve 5 has a smooth outer surface and extends over the entire effective length of the pin 7, the rollers 6 being also mounted thereon. In other respects this embodiment is identical with that shown in Fig. 1.

Figure 3:
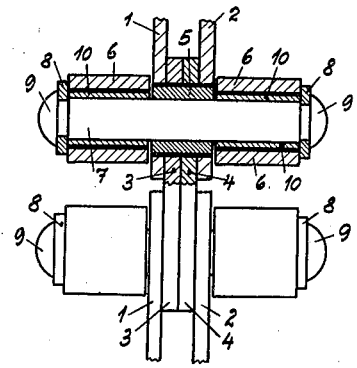

In the embodiment shown in Fig. 3 the sleeve 5 has a smooth outer surface and extends over the combined width of the links only, as in Fig. 1. Between the rollers 6 and the pins 7 bushes 10 of noise suppressing material, such as for example rubber, moulding, artificial resin or the like are disposed.

I claim:

1. A driving chain for driving or driven sprockets comprising links, eyes in said links, pins passing through said links and projecting on both sides of said links, means on said projecting parts of said pins being adapted to engage said sprockets, the ends of said pins having reduced diameter, washers attached on said reduced parts of said pins forming abutments for said means on said projecting parts of said pins and a sleeve on each pin being engaged with play by said eyes of said links.

2. A driving chain for driving or driven sprockets, comprising links, eyes in said links, pins passing through said links and projecting on both sides of said links, a roller on each projecting part on opposite sides of said links of each pin, the ends of said pins having reduced diameter, washers attached on said reduced parts of said pins forming abutments for said means on said projecting parts of said pins and a sleeve on each of said pins being engaged with play by said eyes of said links.

3. A driving chain for driving or driven sprockets, comprising links, eyes in said links, pins passing through said links and projecting on both sides of said links, means on said projecting parts of said pins being adapted to engage said sprockets, the ends of said pins having reduced diameter, washers attached on said reduced parts of said pins forming abutments for said means on said projecting parts of said pins, and a sleeve on each of said pins being shouldered within the range of said links and engaged with play by said eyes of said links.

4. A driving chain for driving or driven sprockets, comprising links, eyes in said links, pins passing through said links and projecting on both sides of said links a roller on each projecting part of each pin on opposite sides of said links and a sleeve on each pin being shouldered within the range of said links and engaged with play by said eyes of said links.

5. A driving chain for driving or driven sprockets, comprising links, eyes in said links, pins passing through said links and projecting on both sides of said links a sleeve on each of said pins being engaged with play by said eyes of said links and extending all over the length of each pin a roller on each of said projecting parts of each pin and said rollers being mounted wholly on said sleeves.

6. A driving chain for driving or driven sprockets comprising links, eyes in said links, pins passing through said links and projecting on both sides of said links a sleeve on each of said pins, being engaged with play by said eyes of said links, a roller on each of said projecting parts of said pins on opposite sides of said links and noise suppressing bushes of rubber or other suitable material being arranged between each pin and each roller.

BRUNO v. FESTENBERG-PAKISCH.